(12) United States Patent
Hartman et al.

(10) Patent No.: US 9,707,967 B2
(45) Date of Patent: Jul. 18, 2017

(54) METHOD OF TRACTION CONTROL FOR A MOTOR VEHICLE

(71) Applicant: KELSEY-HAYES COMPANY, Livonia, MI (US)

(72) Inventors: Patrick A. Hartman, Canton, MI (US); Greg Timm, Commerce, MI (US); Jeff Breitner, South Rockwood, MI (US); Craig B. Mitchell, Swartz Creek, MI (US)

(73) Assignee: Kelsey-Hayes Company, Livonia, MI (US)

( * ) Notice: Subject to any disclaimer, the term of this patent is extended or adjusted under 35 U.S.C. 154(b) by 0 days.

(21) Appl. No.: 14/755,326

(22) Filed: Jun. 30, 2015

(65) Prior Publication Data

US 2017/0001644 A1    Jan. 5, 2017

(51) Int. Cl.
| | |
|---|---|
| *B60W 30/18* | (2012.01) |
| *B60T 8/32* | (2006.01) |
| *B60T 8/171* | (2006.01) |
| *B60T 8/172* | (2006.01) |
| *B60T 13/68* | (2006.01) |
| *B60T 8/48* | (2006.01) |
| *B60T 8/175* | (2006.01) |
| *B60T 13/66* | (2006.01) |

(52) U.S. Cl.
CPC ....... *B60W 30/18145* (2013.01); *B60T 8/171* (2013.01); *B60T 8/172* (2013.01); *B60T 8/175* (2013.01); *B60T 8/3205* (2013.01); *B60T 8/4872* (2013.01); *B60T 13/662* (2013.01); *B60T 13/686* (2013.01); *B60W 30/18027* (2013.01); *B60T 2240/06* (2013.01)

(58) Field of Classification Search
CPC ....... B60W 30/18145; B60W 30/18027; B60T 8/171; B60T 8/172; B60T 8/3205; B60T 11/10
See application file for complete search history.

(56) References Cited

U.S. PATENT DOCUMENTS

| | | | |
|---|---|---|---|
| 6,076,033 | A | 6/2000 | Hamada et al. |
| 6,549,847 | B2 | 4/2003 | Ikeuchi et al. |
| 7,909,126 | B2 | 3/2011 | Gaffney |
| 8,655,563 | B2 | 2/2014 | Maeda et al. |
| 2002/0060103 | A1 | 5/2002 | Ritz et al. |
| 2002/0075139 | A1 | 6/2002 | Yamamoto et al. |

(Continued)

OTHER PUBLICATIONS

Beckman, "The Physics of Racing", No Bucks Racing Club, 1991, pp. 1-144.

(Continued)

*Primary Examiner* — Aaron L Troost
(74) *Attorney, Agent, or Firm* — MacMillan, Sobanski & Todd, LLC

(57) ABSTRACT

A method of traction control for a vehicle. Lateral and longitudinal accelerations are measured for a vehicle. A maximum supportable drive torque for a first wheel of the vehicle is calculated as a function of the lateral and longitudinal accelerations. A commanded vectoring brake torque is applied to the first wheel using a brake device. The commanded vectoring brake torque is an amount by which a driveline torque delivered to the first wheel exceeds the maximum supportable drive torque.

16 Claims, 9 Drawing Sheets

(56) References Cited

U.S. PATENT DOCUMENTS

| | | | |
|---|---|---|---|
| 2006/0180372 A1* | 8/2006 | Mercier | B60T 8/1706 180/210 |
| 2007/0027605 A1* | 2/2007 | Fodor | B60K 28/16 701/82 |
| 2008/0004149 A1 | 1/2008 | Mohan et al. | |
| 2010/0250083 A1 | 9/2010 | Takahashi et al. | |
| 2011/0125382 A1* | 5/2011 | Bonfigt | B60T 8/175 701/71 |
| 2013/0013151 A1 | 1/2013 | Schafiyha et al. | |
| 2014/0131154 A1 | 5/2014 | Ganzel | |
| 2015/0065299 A1 | 3/2015 | Goodrich et al. | |
| 2016/0082937 A1* | 3/2016 | Nakaoka | B60T 8/885 303/15 |

OTHER PUBLICATIONS

Gillespie, "Fundamentals of Vehicle Dynamics", Society of Automotive Engineers, Inc., 1992, Chapters 6 & 10, pp. 195-235, 335-375.

International Search Report and Written Opinion, PCT/US2016/039500, mailed Sep. 28, 2016.

* cited by examiner

METHOD OF TRACTION CONTROL FOR A MOTOR VEHICLE

BACKGROUND OF INVENTION

This invention relates in general to vehicular braking systems and, in particular, to an improved method of traction control using the vehicular braking system.

Vehicles are equipped with a brake system for slowing or stopping movement of the vehicle in a controlled manner. A typical brake system for an automobile or light truck includes a disc brake assembly for each of the front wheels and either a drum brake assembly or a disc brake assembly for each of the rear wheels. The brake assemblies are actuated by hydraulic or pneumatic pressure generated when an operator of the vehicle depresses a brake pedal.

Advances in braking technology have led to the introduction of anti-lock braking systems (ABS). An ABS system monitors wheel rotational behavior and selectively applies and relieves brake pressure in the corresponding wheel brakes in order to maintain the wheel speed within a selected slip range to achieve maximum braking force. While such systems are typically adapted to control braking forces applied to each wheel of the vehicle, some systems have been developed for controlling the braking of only a portion of the plurality of braked wheels.

Electronically controlled ABS valves, which include apply valves and dump valves, are located between the master cylinder and the wheel brakes. The ABS valves regulate the pressure between the master cylinder and the wheel brakes. Typically, when activated, these ABS valves operate in three pressure control modes: pressure apply, pressure dump, and pressure hold. The apply valves allow pressurized brake fluid to flow into respective wheel brakes to increase pressure during the apply mode. The dump valves relieve brake fluid pressure from their associated wheel brakes during the dump mode. Wheel brake pressure is held constant during the hold mode by closing both the apply valves and the dump valves.

A further development in braking technology has led to the introduction of traction control systems. Typically, valves have been added to existing ABS systems to provide a brake system which controls wheel speed during acceleration. Excessive wheel speed during vehicle acceleration leads to wheel slippage and a loss of traction. A traction controller module detects this condition—i.e., a need for traction control—and automatically applies braking pressure to the wheel cylinders of the slipping wheel to reduce the slippage and increase the traction available. In order to achieve optimal vehicle acceleration, pressurized brake fluid is made available to the wheel cylinders even if the master cylinder is not actuated by the driver. Such a traction control system may be as disclosed in U.S. Patent Publication No. 2014/0131154 to Ganzel, the disclosure of which is incorporated herein by reference in entirety.

To detect a need for traction control due to excessive wheel speed during vehicle acceleration, a rotational speed of the wheel may be measured using a rotational speed sensor. However, data from wheel speed sensors do not permit the traction controller module to preemptively judge vehicle operating parameters. Furthermore, the rotational speed sensor may experience oscillations in the rotational speed of the wheel. Therefore, it would be desirable to provide a method of traction control that does not rely exclusively on rotational speed sensor data.

SUMMARY OF INVENTION

This invention relates to vehicular braking systems and, in particular, to an improved method of traction control using the vehicular braking system.

According to one embodiment, a vehicle traction control system may comprise, individually and/or in combination, one or more of the following features: first and second wheels on an axle, a plurality of acceleration sensors, a controller in communication with the plurality of acceleration sensors, and a brake device. The plurality of acceleration sensors measure a lateral acceleration and a longitudinal acceleration. The controller determines a maximum supportable drive torque for the first wheel as a function of the lateral and longitudinal accelerations. The brake device applies a commanded vectoring brake torque to the first wheel. In one embodiment, the commanded vectoring brake torque may have a magnitude of applied reactive torque that is an amount by which a driveline torque delivered to the first wheel exceeds the maximum supportable drive torque.

According to another embodiment, a method of traction control for an automotive vehicle may comprise, individually and/or in combination, one or more of the following features: measuring lateral and longitudinal accelerations for a vehicle, calculating a maximum supportable drive torque for a first wheel of the vehicle as a function of the lateral and longitudinal acceleration, and applying a commanded vectoring brake torque to the first wheel using a brake device. In one embodiment, the commanded vectoring brake torque may be applied in a magnitude by which a driveline torque delivered to the first wheel exceeds the maximum supportable drive torque.

According to another embodiment, a method of traction control for an automotive vehicle may comprise, individually and/or in combination, one or more of the following features: measuring accelerations, determining first and second normal forces, calculating a maximum supportable drive torque, and applying a commanded vectoring brake torque. Lateral and longitudinal accelerations are measured for a turning vehicle. The first normal force is from a roadway surface acting on an inner wheel of the vehicle, relative to the turning direction. The second normal force is from a roadway surface acting on an outer wheel of the vehicle, relative to the turning direction. The inner wheel has a lesser turn radius than the outer wheel. The first and second normal forces are functions of the lateral and longitudinal accelerations. The maximum supportable drive torque is a function of the first and second normal forces. The commanded vectoring brake torque may be applied to the inner wheel using a brake device and is an amount by which a driveline torque delivered to the first wheel exceeds the maximum supportable drive torque.

Other advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
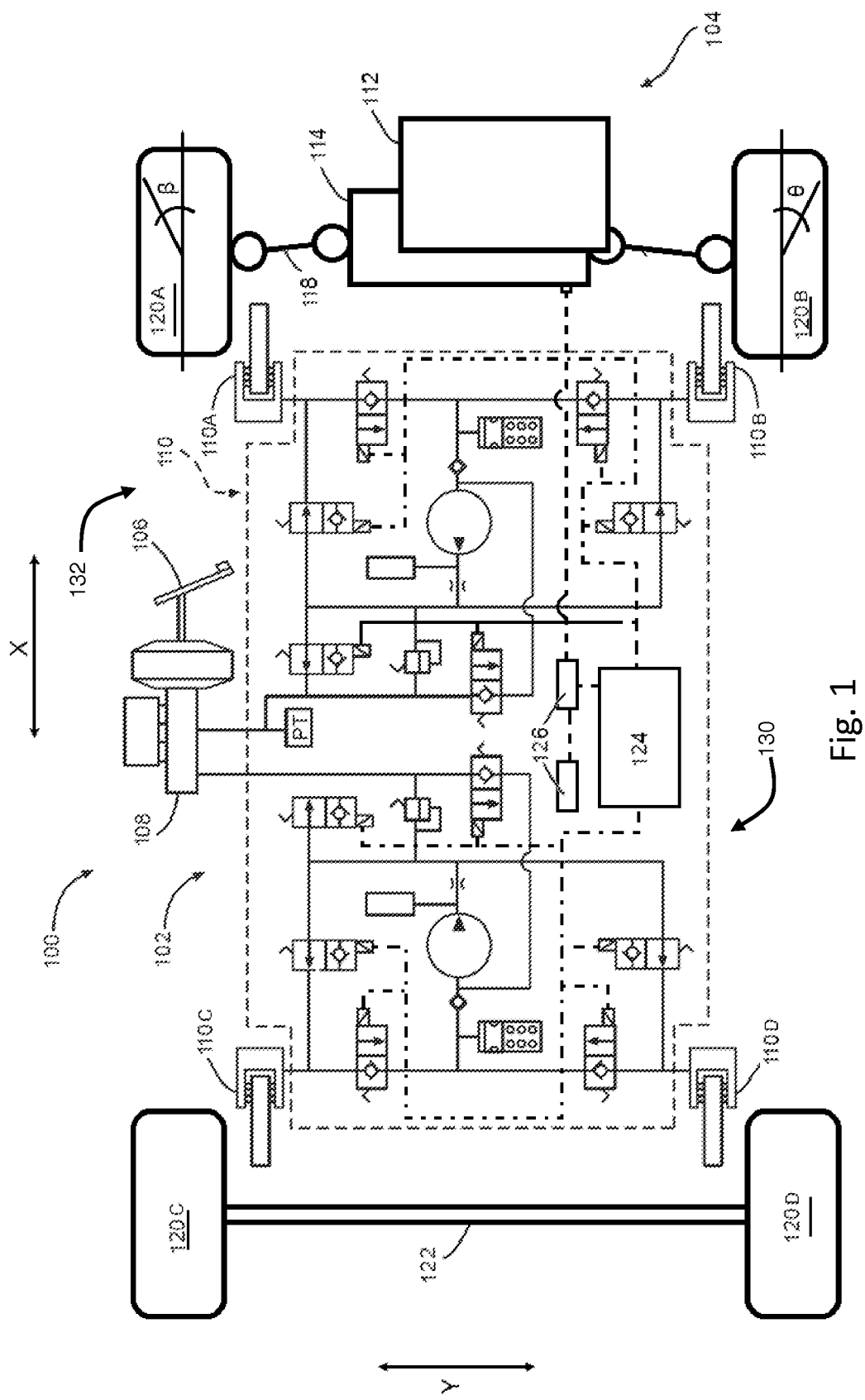
FIG. 1 is a schematic view of a vehicle drive and traction control system.

Referring now to FIG. 1, there is schematically illustrated a vehicle, indicated generally at 100, having a hydraulic brake system, indicated generally at 102, and a vehicle powertrain, indicated generally at 104. The vehicle 100 has a longitudinal direction, X, and a lateral direction, Y.

The hydraulic brake system 102 includes a brake pedal 106 connected to a master cylinder 108. A hydraulic circuit, configured as a hydraulic control unit (HCU) shown generally at 110, provides fluid communication between the master cylinder 108 and a plurality of wheel brakes. The wheel brakes comprise left front, right front, left rear, and right rear hydraulic wheel brakes 110A, 110B, 110C, and 110D, respectively. The wheel brakes are shown as disc brakes but may also be any type of suitable wheel brake known to those skilled in the art.

The illustrated HCU 110 includes at least one pump member that pressurizes and transfers fluid between the master cylinder 108 and the wheel brakes. The HCU 110 further includes various valves and other components that are in fluid communication with the pumps for providing, for example, anti-lock braking, traction control, vehicle stability control, and dynamic brake proportioning functions as directed by a controller 124. It should be understood that the HCU 110 may be configured other than as depicted and may include additional, fewer, or different components and may be configured in different fluid communication arrangements depending on specified performance requirements and/or functions provided by the brake system 102.

In one embodiment, the powertrain 104 may be configured as an engine 112 and a transmission 114. The engine 112 and transmission 114 power a driveline, which in turn powers a front axle 118. The front axle 118 supplies torque to the left front and right front wheels 120A and 120B, respectively. In the illustrated embodiment, left rear and right rear wheels 120C and 120D are unpowered on a rear axle 122. In the illustrated embodiment, the powertrain 104 is a front wheel drive configuration, but the powertrain 104 may be of another suitable configuration. For example, the powertrain 104 may be a rear wheel drive, or all wheel drive configuration.

Alternatively, the transmission 114 may be replaced by an electric machine, which may be a motor or motor generator such that the powertrain 104 is a parallel type hybrid electric powertrain. Alternatively, the engine 112 and electric machine may be configured as another powertrain known to those skilled in the art such as a series type hybrid electric powertrain or powersplit type hybrid electric powertrain. Furthermore, the engine 112 and transmission 114 may be replaced with the electric machine such that the powertrain 104 is an electric only powertrain.

The vehicle 100 includes the controller 124 and sensors 126. The controller 124 is in communication with the HCU 110 and the powertrain 104. The sensors 126 are in communication with the controller 124.

The sensors 126 include a plurality of acceleration sensors that each measure acceleration of the vehicle in at least one of any axial (longitudinal, lateral, or vertical) or rotational (roll, pitch, or yaw) direction of movement. In one embodiment, the acceleration sensors measure a vehicle longitudinal acceleration $A_x$ and a vehicle lateral acceleration $A_y$. The acceleration sensors may or may not be located at a center of gravity 128 for the vehicle 100 (shown in FIGS. 2A and 2B). When the acceleration sensors are not located at the center of gravity 128, correction factors may be used so that the vehicle longitudinal and lateral accelerations $A_x$ and $A_y$, respectively, are compensated for the amount of offset relative to the center of gravity 128.

The sensors 126 also include a steering sensor, an inertial module sensor, and wheel speed sensors. The steering, inertial module, and wheel speed sensors are in communication with the controller 124 and, in combination with parameter values for the vehicle 100, estimate sideslip for the front axle 118. Similarly, sideslip for the rear axle 122 may also be estimated by the controller 124.

When the vehicle 100 is turning at a first turn angle θ from the longitudinal direction X, the right front and right rear wheels 120B and 120D, respectively, are inside wheels 130 and the left front and left rear wheels 120A and 120C, respectively, are outside wheels 132. For a given axle—e.g., the front axle 118 or the rear axle 122—the inside wheels 130 are defined as having a shorter turn radius than the outside wheels 132. As such, when the vehicle 100 is turning at a second turn angle β from the longitudinal direction, the left front and left rear wheels 120A and 120C, respectively, would be the inside wheels and the right front and right rear wheels 120B and 120D, respectively, would be the outside wheels.

In one embodiment, described below, equations supporting a traction control algorithm are derived for setting a commanded vectoring brake torque $T_B$ when the vehicle 100 is turning at the first turn angle θ. However, as one skilled in the art will readily recognize, equations for the commanded vectoring brake torque $T_B$ when the vehicle 100 is turning at the second turn angle β may also be derived in the same manner by switching inside and outside wheel designations.

Figure 2A:
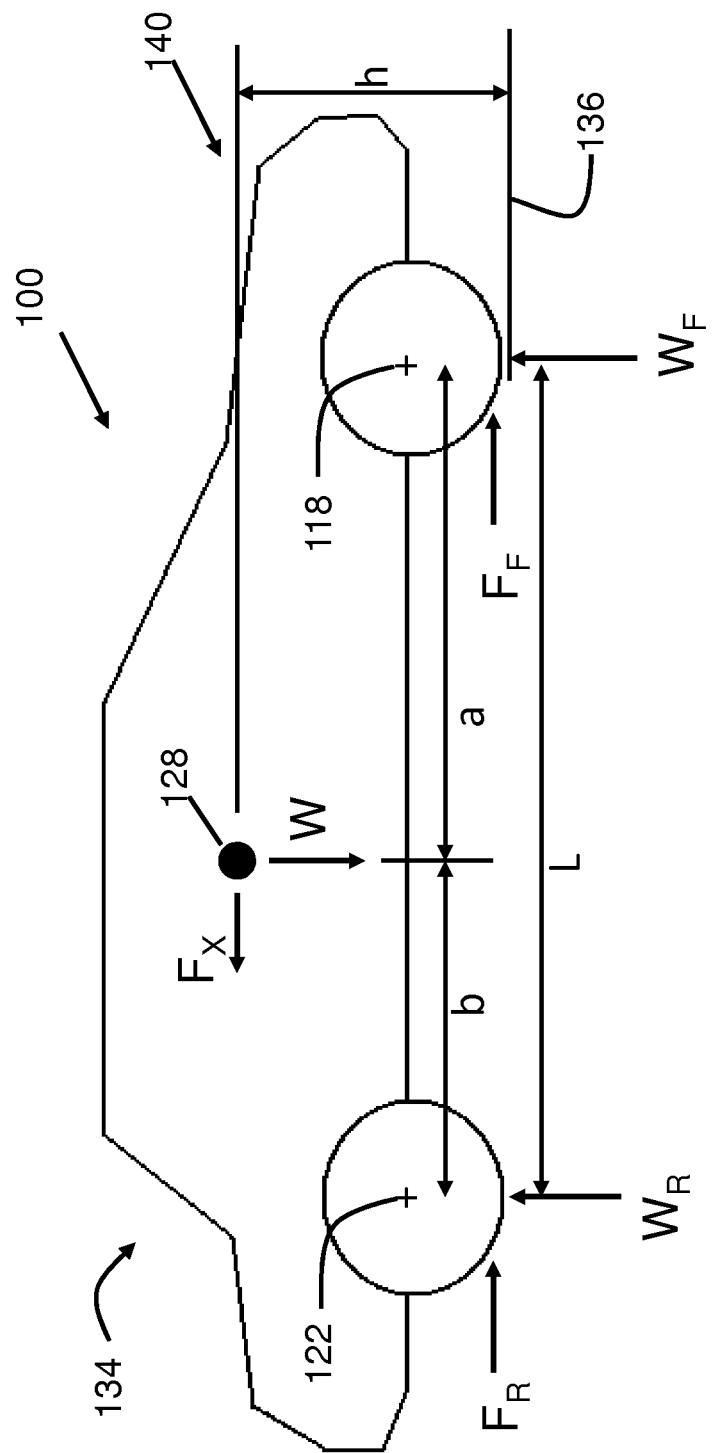
FIG. 2A is a free body diagram along a longitudinal axis of the system of FIG. 1.

Referring now to FIG. 2A there is illustrated a free body diagram, indicated generally at 134, in the longitudinal direction X of the vehicle 100 of FIG. 1. The vehicle 100, as shown in the longitudinal free body diagram 134, has a center of gravity 128 at a first distance a from the front axle 118, a second distance b from the rear axle 122, and at a height h from a roadway surface 136. The first distance a, the second distance b, and the height h are constants set for the vehicle 100 and may be adjusted or tuned for other vehicles. A sum of the first distance a and the second distance b is equal to a wheelbase L.

Through a balance of forces in the longitudinal direction X, a sum of a front axle force $F_F$ acting on the front axle 118 and a rear axle force $F_R$ acting on the rear axle 122 equals a vehicle longitudinal force $F_x$, wherein the vehicle longitudinal force $F_x$ is equal to a vehicle mass m multiplied by the measured longitudinal acceleration $A_x$:

$$m*A_x = F_R + F_F \quad \text{(EQN. 1)}.$$

The vehicle mass m is a constant set for the vehicle 100 and may be adjusted or tuned for other vehicles. A weight W of the vehicle 100 is divided proportionally between a front axle weight $W_F$ on the left front and right front wheels 120A and 120B, respectively, and a rear axle weight $W_R$ on the left rear and right rear wheels 120C and 120D, respectively:

$$W = W_R + W_F \quad \text{(EQN. 2)}.$$

The vehicle weight W is a constant set for the vehicle 100 and may be adjusted or tuned for other vehicles.

Summing moments about the center of gravity 128 gives:

$$W_R*b = (F_R*h) + (F_F*h) + (W_F*a) \quad \text{(EQN. 3)}.$$

Combining EQN. 1 with EQN. 3 gives:

$$W_R*b = [(h*W*A_x)/g] + (W_F*a) \quad \text{(EQN. 4)}$$

where the vehicle mass m is equal to the vehicle weight W divided by a gravitational constant g. Combining EQN. 2 with EQN. 4 gives:

$$W_R; *b = [(h*W*A_x)/g] + a(W-W_R) \quad \text{(EQN. 5A)}.$$

Rearranging terms and recalling that the wheel base L is the sum of the first distance a and the second distance b gives:

$$W_R*L = W[(h*A_x)/g + a] \quad \text{(EQN. 6A)}$$

Using EQN. 2 with EQN. 6 gives:

$$W_R = [(W*a)/L] + [(W*h*A_x)/(g*L)] \quad \text{(EQN. 7A)}.$$

Similarly, by substituting $W_R = W - W_F$ in EQN. 4 and performing similar operations as for EQNS. 5A, 6A, and 7A gives:

$$(W - W_F)b = [(h*W*A_x)/g] + (W_F*a) \quad \text{(EQN. 5B)},$$

$$W_F*L = W[b - (h*A_x)/g] \quad \text{(EQN. 6B), and}$$

$$W_F = [(W*b)/L] - [(W*h*A_x)/(g*L)] \quad \text{(EQN. 7B)}.$$

EQNS. 7A and 7B give the front axle weight $W_F$ and rear axle weight $W_R$ as functions of the longitudinal acceleration $A_x$.

Figure 2B:
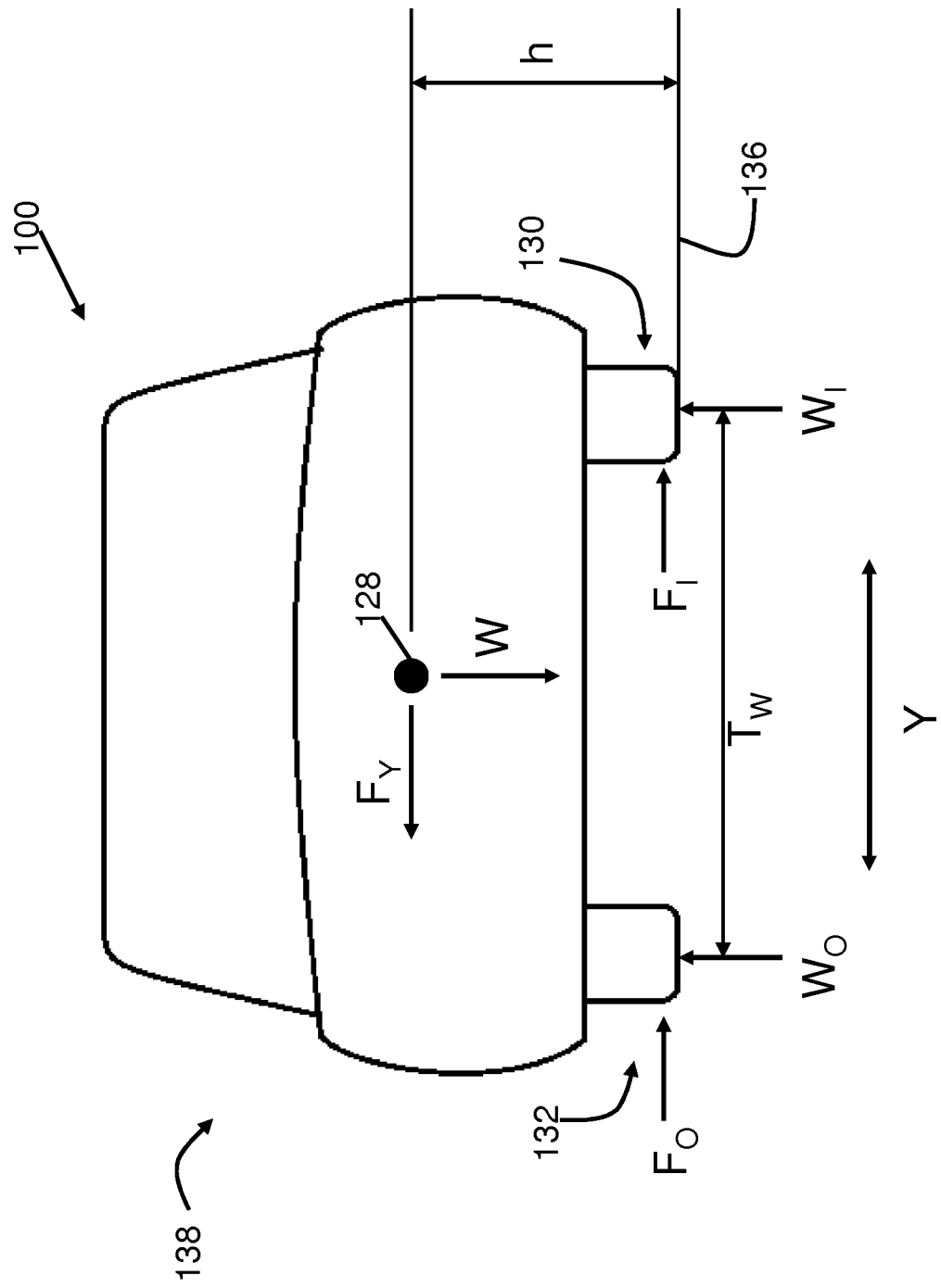
FIG. 2B is a free body diagram along a lateral axis of the system of FIG. 2.

Referring now to FIG. 2B there is illustrated a free body diagram, indicated generally at 138, in the lateral direction Y of the vehicle 100 of FIG. 1. The vehicle 100, as shown in the lateral free body diagram 138 of FIG. 2B, has the center of gravity 134 at the height h from the roadway surface 136. The inside and outside wheels 130 and 132, respectively, are spaced apart by a track width $T_w$. The track width $T_w$ is a constant set for the vehicle 100 and may be adjusted or tuned for other vehicles.

Through a balance of forces in the lateral direction Y, a sum of an outside wheel force $F_O$ acting on the outside wheels 132 and an inside wheel force $F_I$ acting on the inside wheels 130 equals a vehicle lateral force $F_y$, wherein the vehicle lateral force $F_y$ is equal to the vehicle mass m multiplied by the measured longitudinal acceleration $A_y$:

$$m*A_y = F_O + F_I \quad \text{(EQN. 8)}.$$

For the lateral free body diagram 138, the vehicle weight W is divided between an outside wheel weight $W_O$ on the left front and left rear wheels 120A and 120C, respectively, and an inside wheel weight $W_I$ on the right front and right rear wheels 120B and 120D, respectively:

$$W = W_O + W_I \quad \text{(EQN. 9)}.$$

Summing moments about the inside wheels 130 gives:

$$W_O*T_W = (m*A_y*h) + (W*T_w/2) \quad \text{(EQN. 10)}.$$

Using EQN. 9 and EQN. 10, the outside and inside wheel weights $W_O$ and $W_I$, respectively, may be written as:

$$W_O = [(m*A_y*h)/T_w] + (W/2) \quad \text{EQN. 11A) and}$$

$$W_I = (W/2) - [(m*A_y*h)/T_w] \quad \text{(EQN. 11B)}.$$

A first normal force $N_1$ acts where a left front tire on the left front wheel 120A contacts the roadway surface 136, a second normal force $N_2$ acts where a right front tire on the right front wheel 120B contacts the roadway surface 136, a third normal force $N_3$ acts where a left rear tire on the left rear wheel 120C contacts the roadway surface 136, and a fourth normal force $N_4$ acts where a right rear tire on the right rear wheel 120D contacts the roadway surface 136. The first, second, third, and fourth normal forces $N_1$, $N_2$, $N_3$, and $N_4$, respectively, may be expressed, using EQNS. 7A, 7B, 11A, and 11B, as:

$$W_F = N_1 + N_2 = [(W*b)/L] - [(W*h*A_x)/(g*L)] \quad \text{EQN. 12A)},$$

$$W_R = N_3 + N_4 = [(W*a)/L] + [(W*h*A_x)/(g*L)] \quad \text{EQN. 12B)},$$

$$W_O = N_1 + N_3 = (W/2) + [(m*A_y*h)T_w] \quad \text{(EQN. 12C), and}$$

$$W_I = N_2 + N_4 = (W/2) - [(m*A_y*h)/T_w] \quad \text{(EQN. 12D)}.$$

EQNS. 12A-12D may be solved for the first, second, third, and fourth normal forces $N_1$, $N_2$, $N_3$, and $N_4$, respectively:

$$N_1 = (\tfrac{1}{2})\{[(W*b)/L] - [(W*h*A_x)/(g*L)] + [(m*A_y*h)/T_w]\} \quad \text{(EQN. 13A)},$$

$$N_2 = (\tfrac{1}{2})\{[(W*b)/L] - [(W*h*A_x)/(g*L)] - [(m*A_y*h)/T_w]\} \quad \text{(EQN. 13B)},$$

$$N_3 = (\tfrac{1}{2})\{[(W*a)/L] + [(W*h*A_x)/(g*L)] + [(m*A_y*h)/T_w]\} \quad \text{(EQN. 13C), and}$$

$$N_4 = (\tfrac{1}{2})\{[(W*a)/L] + [(W*h*A_x)/(g*L)] - [(m*A_y*h)/T_w]\} \quad \text{(EQN. 13D)}.$$

Adding a roll moment distribution factor (RMD), as a percentage of the vehicle lateral force $F_y$ distributed to a front portion of the vehicle, indicated generally at 140 in FIG. 2A, and substituting $W = m*g$, gives:

$$N_1 = (\tfrac{1}{2})\{[(m*g*b)/L] - [(m*h*A_x)/L] + [(m*A_y*h)(2*RMD)(1/T_w)]\} \quad \text{(EQN. 14A)},$$

$$N_2 = (\tfrac{1}{2})\{[(m*g*b)/L] - [(m*h*A_x)/L] - [(m*A_y*h)(2*RMD)(1/T_w)]\} \quad \text{(EQN. 14B)},$$

$$N_3 = (\tfrac{1}{2})\{[(m*g*a)/L] + [(m*h*A_x)/L] + [(m*A_y*h)(2*(1-RMD))(1/T_w)]\} \quad \text{(EQN. 14C), and}$$

$$N_4 = (\tfrac{1}{2})\{[(m*g*a)/L] + [(m*h*A_x)/L] - [(m*A_y*h)(2*(1-RMD))(1/T_w)]\} \quad \text{(EQN. 14A)},$$

The RMD factor is a constant set for the vehicle 100 and may be adjusted or tuned for other vehicles. Factoring out the vehicle mass m gives:

$$N_1 = (m/2)\{[(g*b)/L] - [(h*A_x)/L] + [(A_y*h)(2*RMD)(1/T_w)]\} \quad \text{(EQN. 15A)},$$

$$N_2 = (m/2)\{[(g*b)/L] - [(h*A_x)/L] - [(A_y*h)(2*RMD)(1/T_w)]\} \quad \text{(EQN. 15B)},$$

$$N_3 = (m/2)\{[(g*a)/L] + [(h*A_x)/L] + [(A_y*h)(2*(1-RMD))(1/T_w)]\} \quad \text{EQN. 15C), and}$$

$$N_4 = (m/2)\{[(g*a)/L] + [(h*A_x)/L] + [(A_y*h)(2*(1-RMD))(1/T_w)]\} \quad \text{EQN. 15D)}.$$

EQNS. 15A-15D may also be written in terms of a front static term $S_F$, a rear static term $S_R$, a longitudinal transfer term $T_x$, and a lateral transfer term $T_y$, a front lateral transfer term $T_{yF}$, and a rear lateral transfer term $T_{yR}$ defined as:

$$S_F=(g*b)/L \quad \text{(EQN. 16)},$$

$$S_R=(g*a)/L \quad \text{(EQN. 17)},$$

$$T_x=(h*A_x)/L \quad \text{(EQN. 18)},$$

$$T_y=(2*A_y*h)/T_w \quad \text{(EQN. 19)},$$

$$T_{yF}=T_y*\text{RMD} \quad \text{(EQN. 20), and}$$

$$T_{yR}=(T_y)(1-\text{RMD})=T_y-T_{yF} \quad \text{(EQN. 21)}.$$

Making these substitutions gives:

$$N_1=(m/2)(S_F-T_x+T_{yF}) \quad \text{EQN. 22A},$$

$$N_2=(m/2)(S_F-T_x-T_{yF}) \quad \text{EQN. 22B},$$

$$N_3=(m/2)(S_R+T_x+T_{yR}) \quad \text{EQN. 22C, and}$$

$$N_4=(m/2)(S_R-T_x+T_{yR}) \quad \text{EQN. 22D}.$$

For a powered axle of the vehicle 100, EQNS. 1-22D may be used to calculate an inner wheel normal force $N_I$ acting on the inside wheel 130 and an outer wheel normal force $N_O$ acting on the outside wheel 132. The powered axle may be either the front axle 118 (as is illustrated in FIG. 1), the rear axle 122, or both the front and rear axles 118 and 122, respectively. Because, for the following example of the traction control system operation, below, the front axle 118 is powered and the vehicle 100 is turning at the first angle θ, the inner wheel normal force $N_I$ acts on the right front wheel 120B and the outer wheel normal force $N_O$ acts on the left front wheel 120A.

When the powered axle is other than the front axle 118 and the turn angle other than the first turn angle θ, the wheels upon which the inner and outer wheel normal forces $N_I$ and $N_O$, respectively, act change. For example, when the vehicle 100 turns at the second angle β, the inner wheel normal force $N_I$ acts on the left front wheel 120A and the outer wheel normal force $N_O$ acts on the right front wheel 120B. For example, when the rear axle 122 is powered and the vehicle 100 turns at the first angle θ, the inner wheel normal force $N_I$ acts on the right rear wheel 120D and the outer wheel normal force $N_O$ acts on the left rear wheel 120C. For example, when the rear axle 122 is powered and the vehicle 100 turns at the second angle β, the inner wheel normal force $N_I$ acts on the left rear wheel 120C and the outer wheel normal force $N_O$ acts on the right rear wheel 120D.

The inner wheel normal force $N_I$ and the outer wheel normal force $N_O$ may be used to calculate the commanded vectoring brake torque $T_B$ for the wheels on the powered axle. For the inner wheel, a relationship exists between an inner wheel maximum force $F_{maxI}$, an inner wheel lateral force $F_{yI}$, and a maximum inner wheel longitudinal force $F_{x,maxI}$:

$$F_{maxI}^2=F_{x,maxI}^2+F_{yI}^2 \quad \text{(EQN. 23)}.$$

The maximum inner wheel longitudinal force $F_{x,maxI}$ is a function of the inner wheel lateral force $F_{yI}$. The inner wheel maximum force $F_{maxI}$ is equal to the product of a coefficient of friction μ between the tire on the inner wheel and the roadway surface 136 supporting the inner wheel and the inner wheel normal force $N_I$:

$$F_{maxI}=\mu*N_I \quad \text{(EQN. 24)}.$$

The controller 124 estimates the coefficient of friction μ between the tire on the inner wheel and the roadway surface 136. The current inner wheel lateral force $F_{yI}$ is:

$$F_{yI}=-C_\alpha*\alpha*N_I/(N_I+N_O) \quad \text{(EQN. 25)}$$

where $C_\alpha$ is a cornering coefficient and α is an axle sideslip estimated by the controller 124. The cornering coefficient $C_\alpha$ is a constant set for the vehicle 100 and may be adjusted or tuned for other vehicles.

Combining EQNS. 24 and 25 with EQN. 23, and solving for the maximum inner wheel longitudinal force $F_{x,maxI}$, gives:

$$F_{x,maxI}=\{(\mu*N_I)^2-[-C_\alpha*\alpha*N_I/(N_I+N_O)]^2\}^{0.5} \quad \text{(EQN. 26)}.$$

A maximum supportable inner wheel drive torque $T_{maxI}$ is:

$$T_{maxI}=F_{x,maxI}*R_T \quad \text{(EQN. 27)}$$

where $R_T$ is a radius of a tire on the inner wheel. The tire radius $R_T$ is a constant set for the tire used on the inner wheel and may be adjusted or tuned for other tires that may be used. Lastly, the commanded vectoring brake torque $T_B$ is:

$$T_B=\text{MAX}(0,T_{axle}/2-T_{maxI}) \quad \text{(EQN. 28)}$$

wherein $T_{axle}$ is a driveline axle torque and $T_{axle}/2$ is the driveline torque delivered to the inner wheel. EQN. 28 ensures that the commanded vectoring brake torque $T_B$ is zero until the driveline axle torque $T_{axle}$ on the inner wheel exceeds the maximum supportable inner wheel drive torque $T_{maxI}$.

EQN. 28 may be used with multiple powered axles. The commanded vectoring brake torque $T_B$ is calculated for the inner wheel of each powered axle using the driveline axle torque $T_{axle}$ going to each inside wheel and the maximum supportable inner wheel drive torque for each $T_{maxI}$ for each inner wheel. Examples of such multiple powered axle applications include four wheel drive or all wheel drive.

Figure 3:
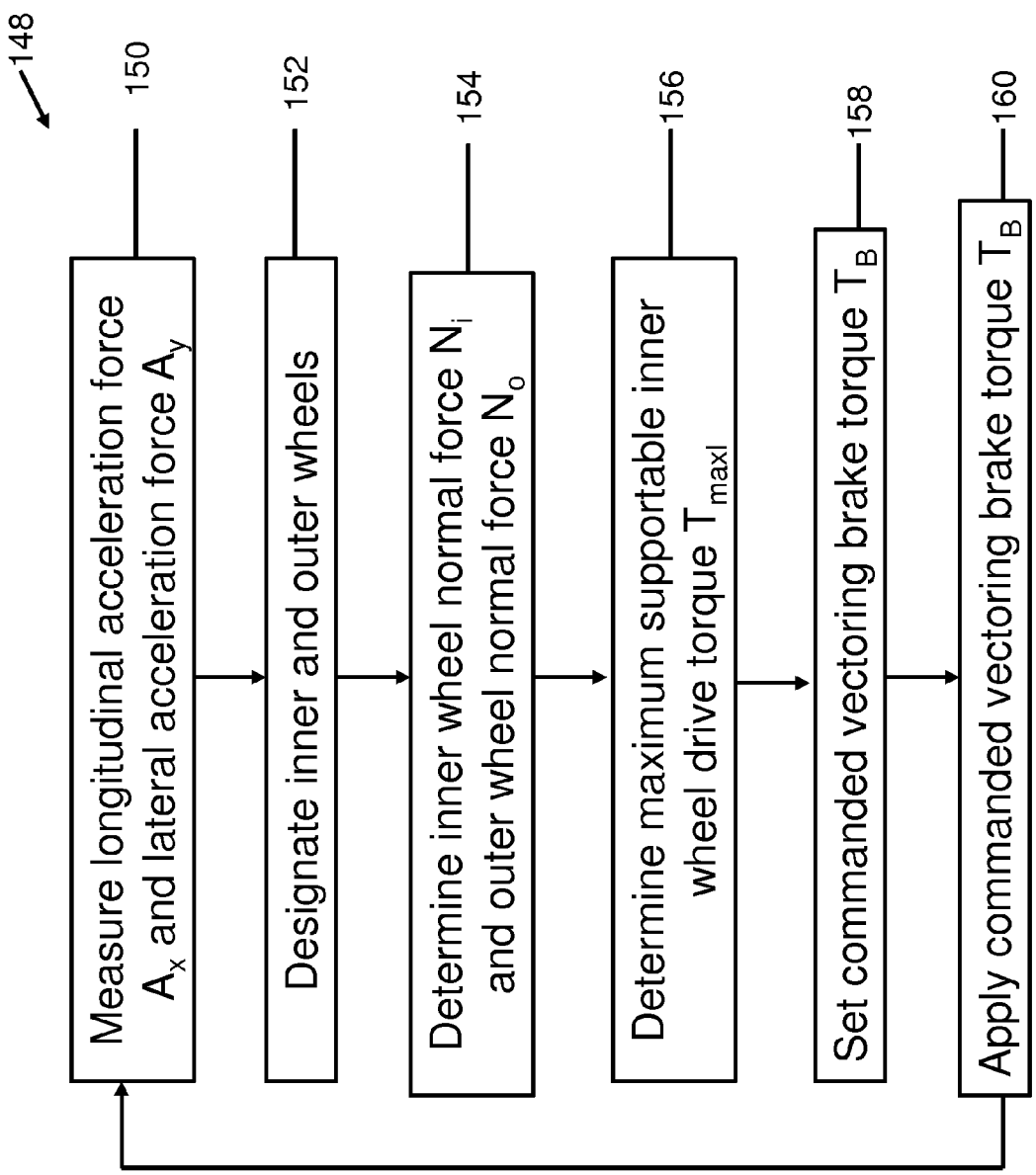
FIG. 3 is a flowchart of a method of traction control in accordance with the various embodiments described herein and for use with the system illustrated in FIG. 1.

Referring now to FIG. 3, there is illustrated a flow chart 148 of the traction control algorithm for the vehicle 100 that uses the EQNS. 1-28. In a step 150, the longitudinal acceleration $A_x$ and the lateral acceleration $A_y$ are measured by acceleration sensors and communicated to the controller 124. The inner and outer wheels are then designated in a step 152. Next, in a step 154, the inner and outer wheel normal forces $N_I$ and $N_O$, respectively, are determined by the controller using EQNS. 1-22D. The controller 124 next determines, in a step 156, the maximum supportable inner wheel drive torque $T_{maxI}$. In a step 158, the controller applies EQN. 28 to set the commanded vectoring brake torque $T_B$. In a step 160, the commanded vectoring brake torque $T_B$, set in the step 158, is applied using at least one brake device. The brake device may be the hydraulic brake system 102 only, electric machine only, or both the hydraulic brake system 102 and electric machine 114 used in combination. The flow chart 148 then returns to the step 150.

Figure 4:
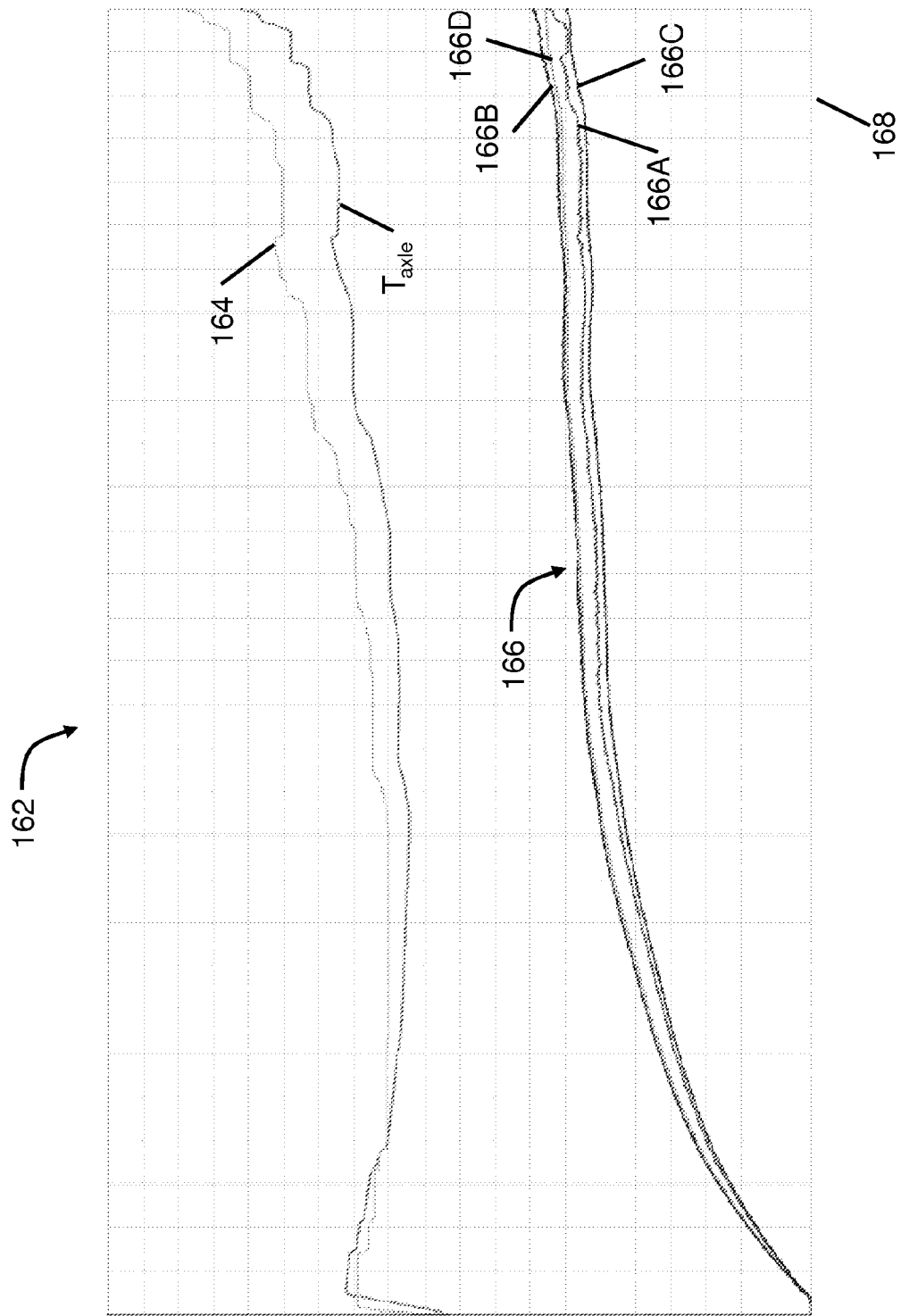
FIG. 4 is a graph of traction control system inputs for embodiments of the system and the method of traction control.

Referring now to FIGS. 4-8, there is illustrated a non-limiting example of the traction control system employing the traction control algorithm illustrated in FIG. 3. In FIG. 4, a first graph, indicated generally at 162, shows a pedal position 164 of an accelerator pedal, the driveline axle torque $T_{axle}$, and wheel speeds, indicated generally at 166, along a time axis 168. The wheel speeds 166 include a first wheel speed 166A for the left front wheel 120A, a second wheel speed 166B for the right front wheel 120B, a third wheel speed 166C for the left rear wheel 120C, and a fourth wheel speed 166D for the right rear wheel 120D. The time axis 168 starts with the vehicle 100 stopped and stationary. A steering wheel of the vehicle 100 is turned and held as far leftward as possible. The accelerator pedal is then slowly depressed, causing the pedal position 164 to advance and driveline axle torque $T_{axle}$ to increase. The wheel speeds 166A-D also increase.

Figure 5:
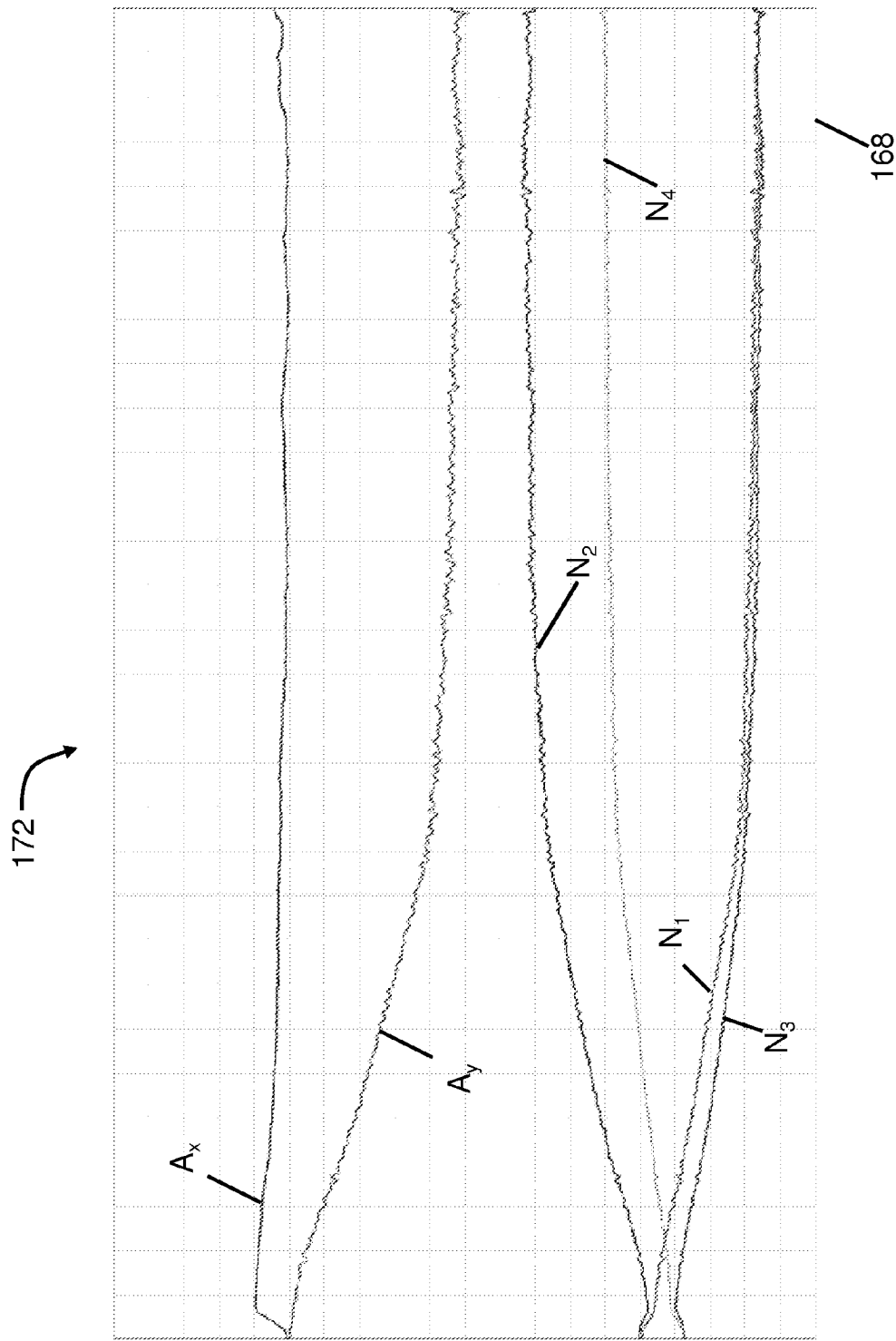
FIG. 5 is a graph of traction control system measurements and calculated outputs for embodiments of the system and the method of traction control.

In FIG. 5, a second graph, indicated generally at 172, shows changes in the longitudinal acceleration $A_x$, the lateral acceleration $A_y$, as well as the first normal force $N_1$, the second normal force $N_2$, the third normal force $N_3$, and the fourth normal force $N_4$ over time, which is identified as axis 168. As the wheel speeds 166A-D increase (as shown in FIG. 4), the longitudinal and lateral accelerations $A_x$ and $A_y$, respectively, begin to change. The changing longitudinal and lateral accelerations $A_x$ and $A_y$, respectively, cause the first and third normal forces $N_1$ and $N_3$, respectively, to decrease, and the second and fourth normal forces $N_2$ and $N_4$, to increase. The first through fourth normal forces $N_1$-$N_4$, respectively, are derived from the associated lateral and longitudinal accelerations.

Figure 6:
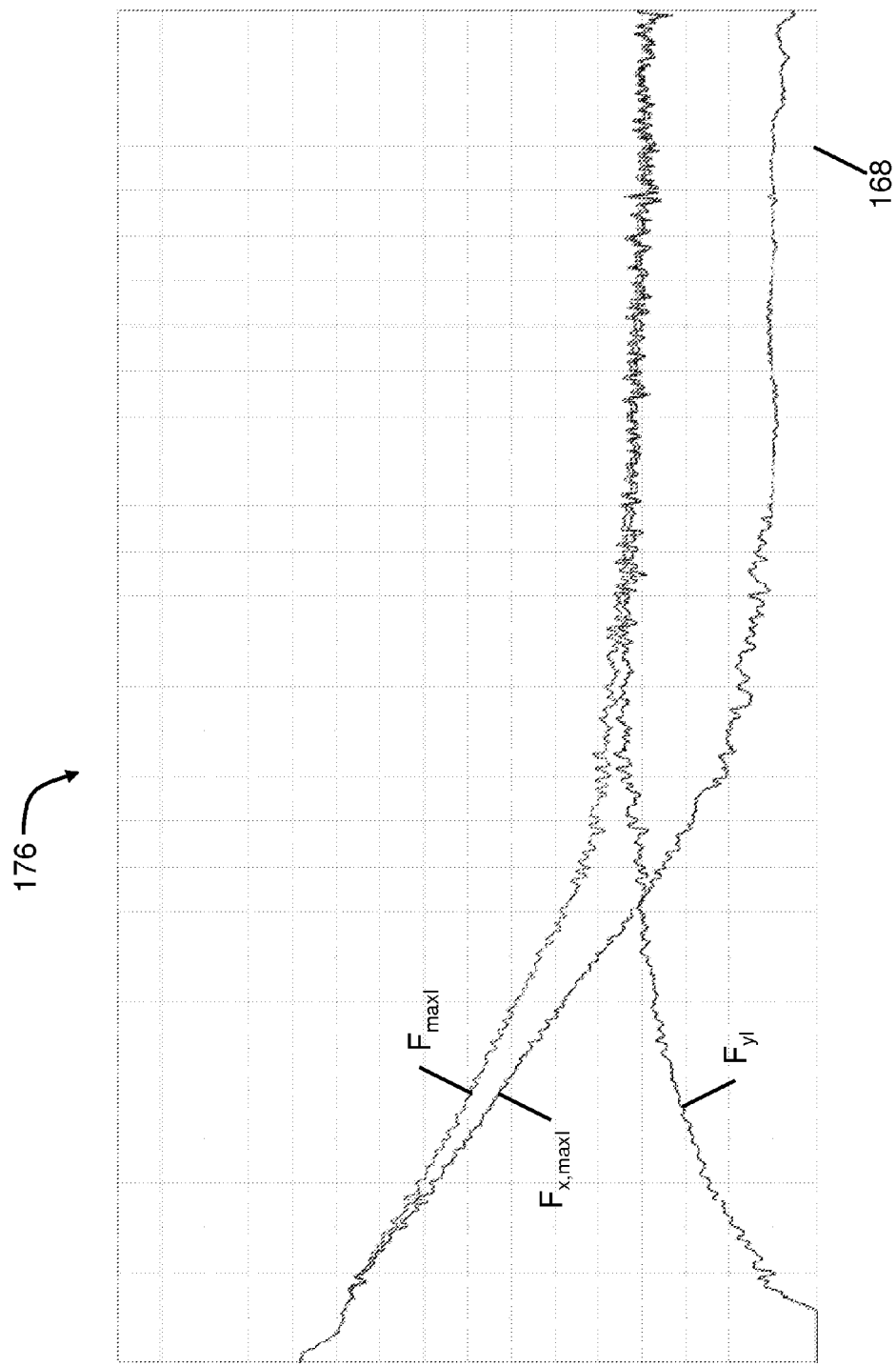
FIG. 6 is a graph of traction control system estimates of operating parameters of the vehicle for use with embodiments of the system and the method of traction control.

In FIG. 6, a third graph, indicated generally at 176, shows the inner wheel maximum force $F_{maxI}$, the inner wheel lateral force $F_{yI}$, and the maximum inner wheel longitudinal force $F_{x,maxI}$ plotted against the time axis 168. Once the inner drive tire normal force is estimated, as shown in FIG. 5, the maximum inner wheel force, plotted as $F_{maxI}$, may be estimated using EQN. 24 as the product of the coefficient of friction $\mu$ and the corresponding inner wheel normal force $N_I$. The inner wheel lateral force, plotted as $F_{yI}$—i.e., an amount of the maximum force that is utilized as a turning force—may be estimated using EQN. 25 as the product of the cornering coefficient $C_\alpha$, the axle sideslip $\alpha$, the inner wheel normal force $N_I$, and the outer wheel normal force $N_O$ (the inner and outer wheel normal forces $N_I$ and $N_O$, respectively, being the normal forces acting on the axle). The maximum inner wheel longitudinal force, plotted as $F_{x,maxI}$, is estimated, using EQN. 26, as the square root of a difference between the inner wheel maximum force $F_{maxI}$ squared and the inner wheel lateral force $F_{yI}$ squared.

Figure 7:
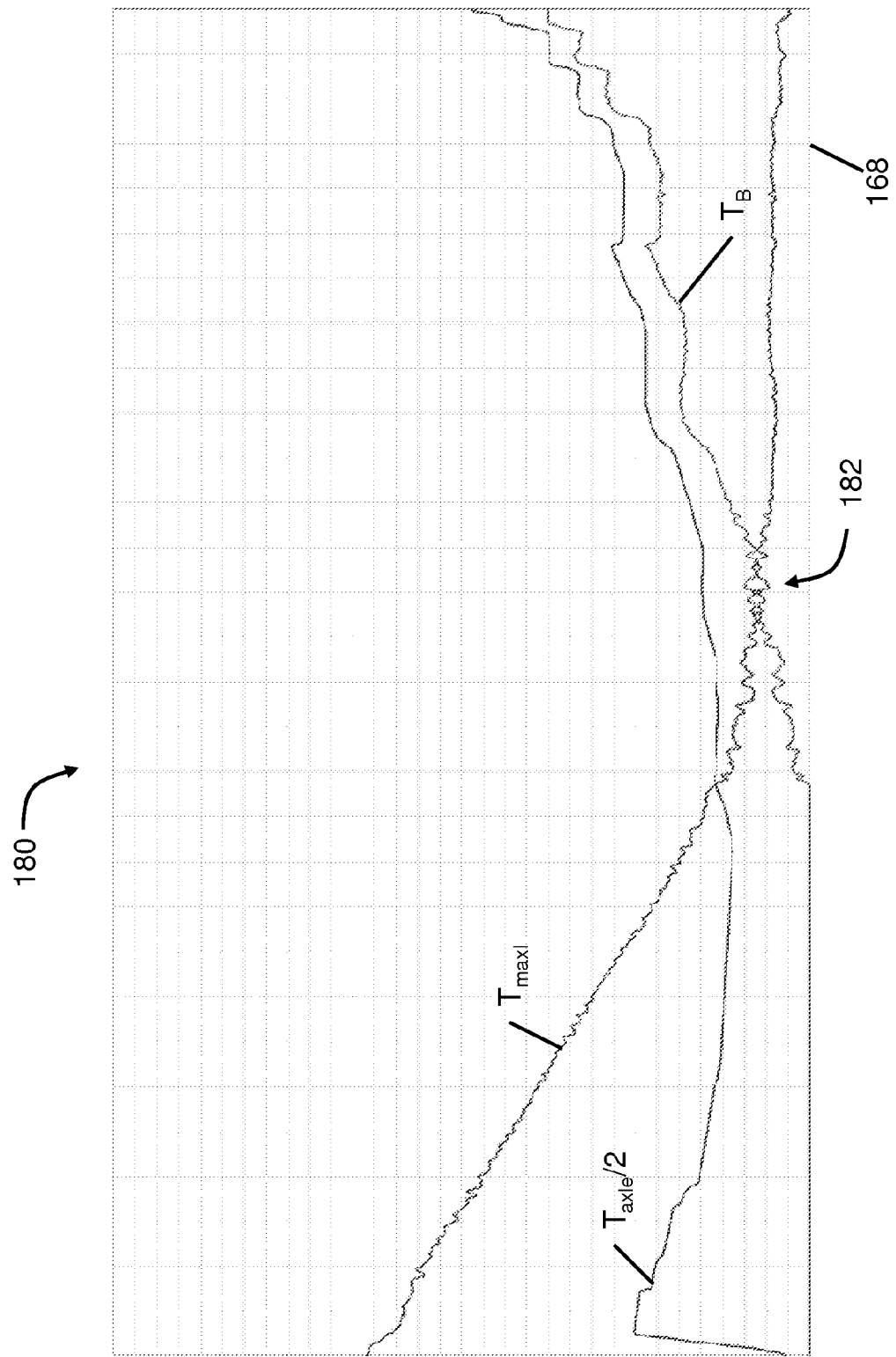
FIG. 7 is a graph of traction control system calculations and control system outputs for use with embodiments of the system and the method of traction control.

In FIG. 7, a fourth graph, indicated generally at 180, shows the commanded vectoring brake torque $T_B$, the driveline torque delivered to the inner wheel $T_{axle}/2$, and the maximum supportable inner wheel drive torque $T_{maxI}$. The maximum supportable inner wheel drive torque, plotted as $T_{maxI}$, is estimated using EQN. 27 as the product of the maximum inner wheel longitudinal force $F_{x,maxI}$ (as shown in FIG. 6) and the inner wheel tire radius $R_T$. As previously described, the driveline torque delivered to the inner wheel $T_{axle}/2$ represents half of the delivered axle torque from the powertrain 104. An amount by which the driveline torque delivered to the inner wheel $T_{axle}/2$ line exceeds the maximum inner wheel longitudinal force $F_{maxI}$ line, after the lines cross at an approximate time indicated generally at 182, represents excess drive torque that results in wheel slip instead of vehicle acceleration. The commanded vectoring brake torque $T_B$—i.e., the required brake torque—may be estimated using EQN. 28 and is a delta difference between the driveline torque delivered to the inner wheel $T_{axle}/2$ and the maximum supportable inner wheel drive torque $T_{maxI}$.

Figure 8:
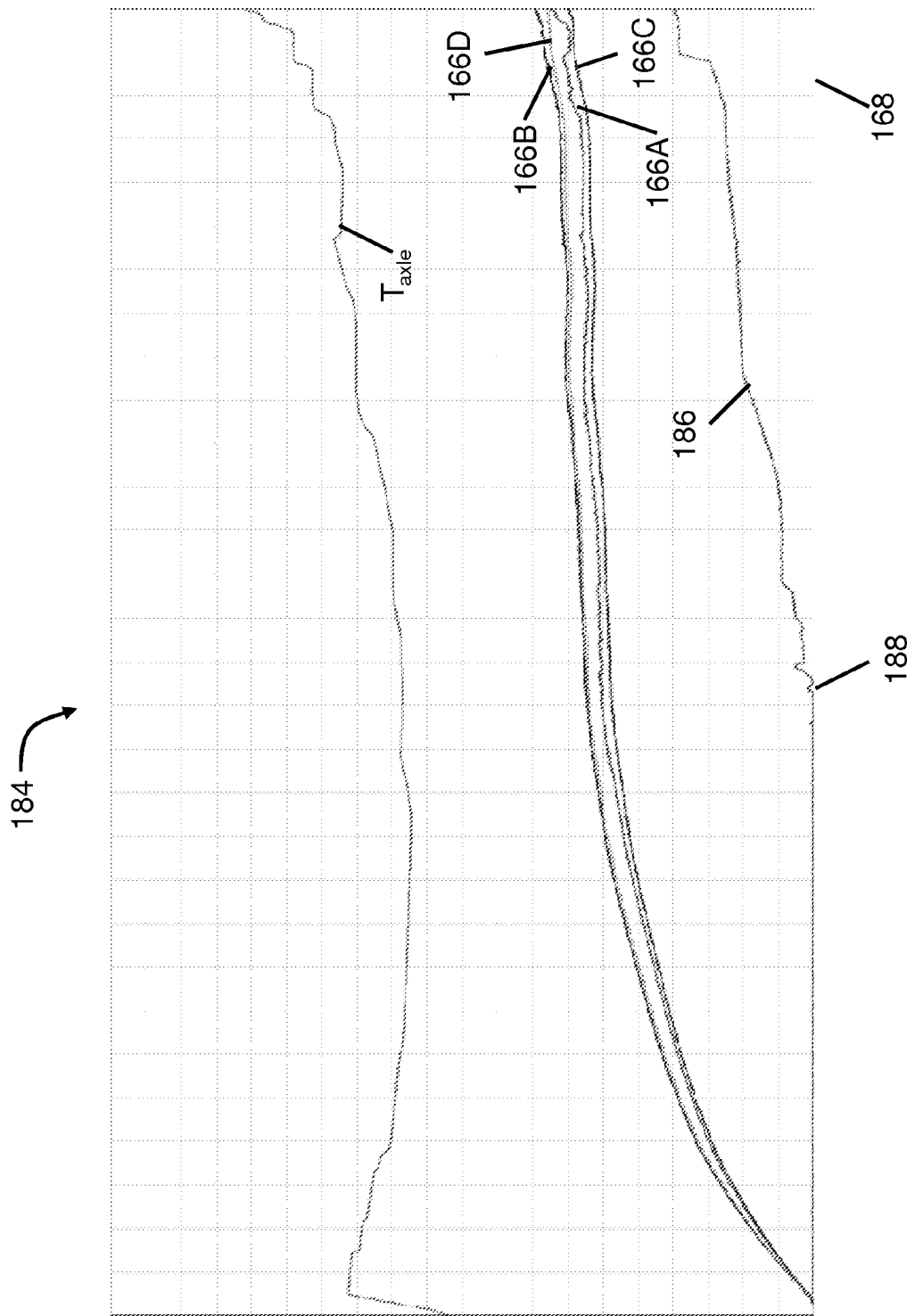
FIG. 8 is a graph of traction control system inputs similar to FIG. 4 showing a system command output parameter for use with the embodiments of the system and the method of traction control.

In FIG. 8, a fifth graph, indicated generally at 184, shows the driveline axle torque $T_{axle}$, the wheel speeds 166A-D, and a brake caliper pressure command 186 for the left front wheel brake 110 along the time axis 168. The caliper pressure 186 is calculated by the controller 124 to provide the commanded vectoring brake torque $T_B$ starting at a time point 188. As shown in FIG. 8, the brake caliper pressure command 186, determined for the left front wheel brake in this illustration, is based on the commanded brake torque $T_B$ from FIG. 7. The brake pressure applied to the left front wheel 120A—i.e., the inside drive front wheel—reduces slip for the left front wheel 120A and permits more drive torque to be applied to the right front wheel 120B—i.e, the outside front wheel.

In accordance with the provisions of the patent statutes, the principle and mode of operation of this invention have been described and illustrated in its preferred embodiments. However, it must be understood that this invention may be practiced otherwise than as specifically explained and illustrated without departing from its spirit or scope.

What is claimed is:

1. A vehicle traction control system comprising:
    first and second wheels on an axle;
    a plurality of acceleration sensors measuring a lateral acceleration and a longitudinal acceleration;
    a controller in communication with the plurality of acceleration sensors and determining a maximum supportable drive torque for the first wheel as a function of the lateral acceleration and the longitudinal acceleration; and
    a brake device for applying a commanded vectoring brake torque to the first wheel, wherein the commanded vectoring brake torque is an amount by which a driveline torque delivered to the first wheel exceeds the maximum supportable drive torque, wherein the maximum supportable drive torque is a function of a radius of a tire on the first wheel and a first wheel maximum longitudinal force; and wherein the first wheel maximum longitudinal force is a function of a first wheel maximum force and a first wheel lateral force.

2. The vehicle traction control system of claim 1 wherein the brake device is a hydraulic brake system of the vehicle.

3. The vehicle traction control system of claim 1 wherein the brake device is an electric machine of the vehicle.

4. The vehicle traction control system of claim 1 wherein the vehicle is turning and the first wheel has a lesser turning radius than the second wheel.

5. The vehicle traction control system of claim 1 wherein the controller calculates a normal force acting on at least one of the first and second wheels against a roadway surface supporting the first and second wheels and wherein the normal force is used to calculate the maximum supportable drive torque.

6. The vehicle traction control system of claim 1 wherein the first wheel maximum force is a function of a normal force acting on the first wheel and a coefficient of friction for a roadway surface.

7. The vehicle traction control system of claim 1 wherein the first wheel lateral force is a function of normal forces acting on the first and second wheels.

8. A method of traction control for a vehicle comprising the steps of:
    measuring a lateral acceleration and a longitudinal acceleration for a vehicle;
    determining a maximum supportable drive torque for a first wheel of the vehicle as a function of the lateral acceleration and the longitudinal acceleration;
    applying a commanded vectoring brake torque to the first wheel using a brake device, wherein the commanded vectoring brake torque is an amount by which a driveline torque delivered to the first wheel exceeds the maximum supportable drive torque;
    calculating the maximum supportable drive torque as a function of a radius of a tire on the first wheel and a first wheel maximum longitudinal force; and calculating the first wheel maximum longitudinal force acting on the first wheel as a function of a first wheel maximum force and a first wheel lateral force.

9. The method of traction control of claim 8 wherein the commanded vectoring brake torque is applied by a hydraulic brake system of the vehicle.

10. The method of traction control of claim 8 wherein the commanded vectoring brake torque is applied by an electric machine of the vehicle.

11. The method of traction control of claim 8 wherein the first wheel has a lesser turning radius than a second wheel on an axle with the first wheel.

12. The method of traction control of claim 8 comprising the further step of:
    determining a normal force acting between one of the first wheel and a second wheel and a roadway surface, wherein the second wheel is on an axle with the first wheel and the normal force is used to calculate the maximum supportable drive torque.

13. The method of traction control of claim 8 comprising the further step of:
    calculating the first wheel maximum force as a function of a normal force acting on the first wheel and a coefficient of friction for a roadway surface.

14. The method of traction control of claim 8 comprising the further step of:
    calculating the first wheel lateral force as a function of the normal force acting on the first wheel and a normal force acting on a second wheel on an axle with the first wheel.

15. The method of traction control of claim 8 comprising the further step of:
    designating the first wheel as an inner wheel and the second wheel as an outer wheel, wherein the inner wheel has a lesser turning radius than the outer wheel.

16. A method of traction control for an automotive vehicle comprising the steps of:
    measuring a lateral acceleration and a longitudinal acceleration for a turning vehicle;
    determining a first normal force acting on an inner wheel of the vehicle by a roadway surface, wherein the first normal force is a function of the lateral acceleration and the longitudinal acceleration;
    determining a second normal force acting on an outer wheel of the vehicle by the roadway surface, wherein the second normal force is a function of the lateral acceleration and the longitudinal acceleration, and wherein the inner wheel has a lesser turn radius than the outer wheel;
    determining a maximum supportable drive torque for the first wheel as a function of the first and second normal forces; and
    applying a commanded vectoring brake torque to the inner wheel using a brake device, wherein the commanded vectoring brake torque is an amount by which a driveline torque delivered to the first wheel exceeds the maximum supportable drive torque.

* * * * *